US012602779B2

(12) United States Patent
Saikou

(10) Patent No.: US 12,602,779 B2
(45) Date of Patent: Apr. 14, 2026

(54) IMAGE PROCESSING DEVICE, IMAGE PROCESSING METHOD AND STORAGE MEDIUM

(71) Applicant: NEC Corporation, Tokyo (JP)

(72) Inventor: Masahiro Saikou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 321 days.

(21) Appl. No.: 18/278,294

(22) PCT Filed: Feb. 26, 2021

(86) PCT No.: PCT/JP2021/007346
§ 371 (c)(1),
(2) Date: Aug. 22, 2023

(87) PCT Pub. No.: WO2022/180786
PCT Pub. Date: Sep. 1, 2022

(65) Prior Publication Data
US 2024/0127434 A1     Apr. 18, 2024

(51) Int. Cl.
*G06K 9/00*          (2022.01)
*G06T 7/00*          (2017.01)
(Continued)

(52) U.S. Cl.
CPC .............. *G06T 7/0012* (2013.01); *G06T 7/11* (2017.01); *G06V 10/25* (2022.01); *G06V 10/761* (2022.01);
(Continued)

(58) Field of Classification Search
None
See application file for complete search history.

(56) References Cited

U.S. PATENT DOCUMENTS

2017/0112353 A1     4/2017  Ikemoto et al.
2019/0205606 A1*    7/2019  Zhou ..................... G06F 18/285
(Continued)

FOREIGN PATENT DOCUMENTS

CN          111861928 A      10/2020
JP          2016-154588 A     9/2016
(Continued)

OTHER PUBLICATIONS

Ji et al., "A multi-scale recurrent fully convolutional neural network for laryngeal leukoplakia segmentation" (Year: 2020).*
(Continued)

*Primary Examiner* — SJ Park

(57) ABSTRACT

The image processing device 1X includes an acquisition means 31X, a mask image generation means 32X, and an identification means 33X. The acquisition means 31X acquires a captured image acquired by photographing an inspection target by a photographing unit provided in an endoscope. The mask image generation means 32X generates a plurality of mask images which indicate candidate areas of an attention part in the captured image by different levels of granularity. The identification means 33X identifies the attention part based on the plurality of the mask images. The image processing device is able to support decision-making based on identification results of the attention part in endoscopic examination.

20 Claims, 10 Drawing Sheets

(51) Int. Cl.

| | | |
|---|---|---|
| *G06T 7/11* | (2017.01) | |
| *G06V 10/25* | (2022.01) | |
| *G06V 10/74* | (2022.01) | |
| *G06V 10/771* | (2022.01) | |

(52) U.S. Cl.
CPC .. *G06V 10/771* (2022.01); *G06T 2207/10068* (2013.01)

(56) References Cited

U.S. PATENT DOCUMENTS

| | | |
|---|---|---|
| 2020/0065961 A1 | 2/2020 | Zhao et al. |
| 2021/0267544 A1 | 9/2021 | Saikou |

FOREIGN PATENT DOCUMENTS

| | | |
|---|---|---|
| WO | 2020/003607 A1 | 1/2020 |
| WO | 2020/003992 A1 | 1/2020 |
| WO | 2020/012530 A1 | 1/2020 |

OTHER PUBLICATIONS

International Search Report for PCT Application No. PCT/JP2021/007346, mailed on Apr. 6, 2021.

Tsung-Yi Lin et al., "Feature pyramid networks for object detection", In CVPR, 2017.

Rebecca C Fitzgerald et al., "British Society of Gastroenterology guidelines on the diagnosis and management of Barrett's oesophagus", <https://www.bsg.org.uk/wp-content/uploads/2019/12/BSG-guidelines-on-the-diagnosis-and-management-of-Barretts-oesophagus.pdf>, Oct. 28, 2013, p. 17.

JP Official Communication for JP Application No. 2023-501952, mailed on Apr. 2, 2024 with English Translation.

Extended European Search Report for EP Application No. 21859349.9, dated on Feb. 8, 2024.

Ruru Zhang et al., "BMM-Net: Automatic Segmentation of Edema in Optical Coherence Tomography Based on Boundary Detection and Multi-Scale Network", Proceeding of the ACM Conference on Health, Inference and Learning, ACM CHIL '20, Apr. 2, 2020, pp. 51-59.

Hengshuang Zhao et al., "PSANet: Point-wise Spatial Attention Network for Scene Parsing", Oct. 5, 2018, pp. 270-286.

Zongwei Zhou et al., "UNet++: Redesigning Skip Connections to Exploit Multiscale Features in Image Segmentation", IEEE Transactions on Medical Imaging, vol. 39, No. 6, Dec. 12, 2019, pp. 1856-1867.

EP Office Action for EP Application No. 21859349.9, mailed on Aug. 12, 2025.

* cited by examiner

100:ENDOSCOPIC INSPECTION SYSTEM

FIG. 3

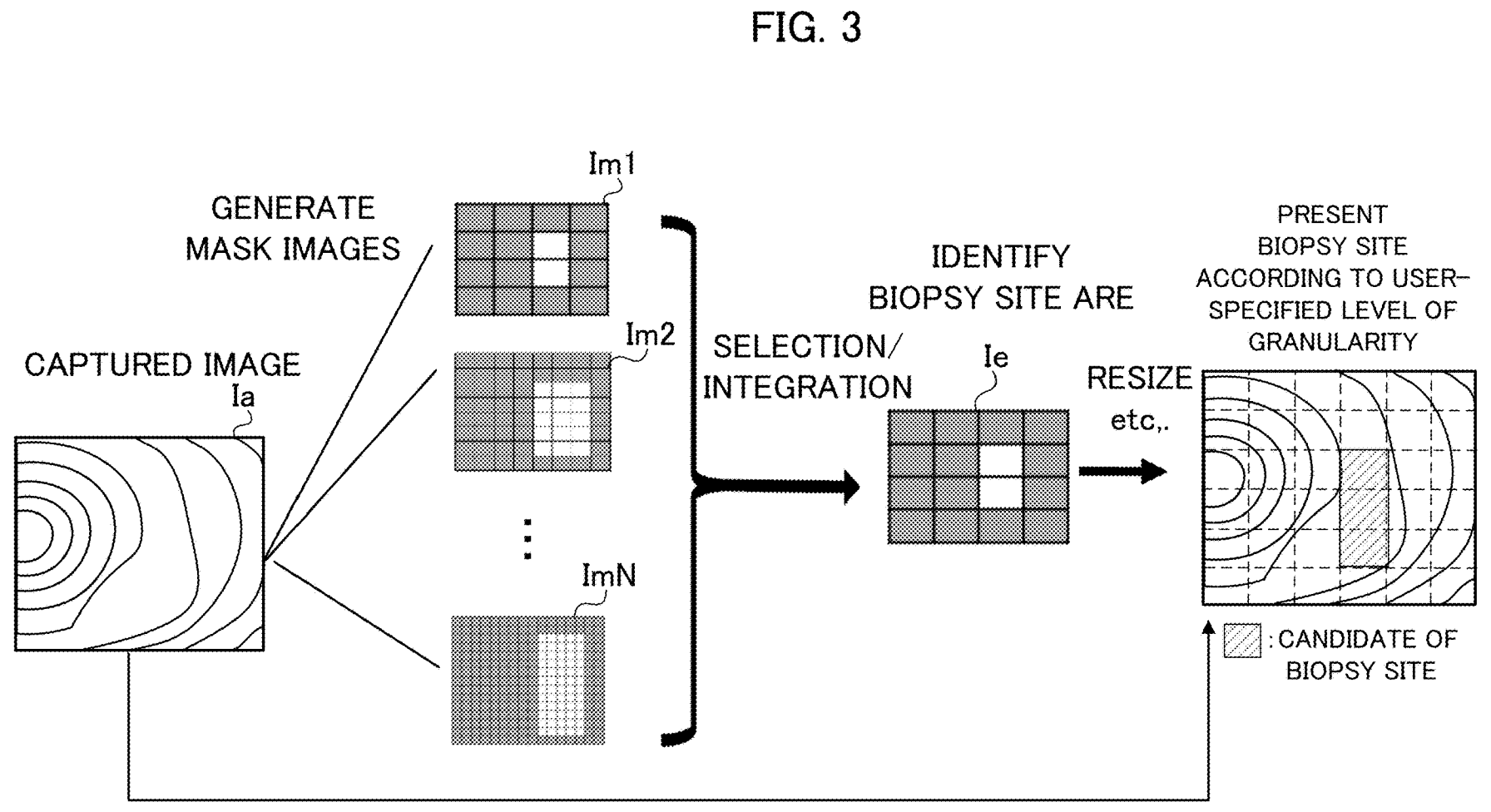

GENERATE MASK IMAGES

CAPTURED IMAGE
Ia

Im1

Im2

ImN

SELECTION/ INTEGRATION

IDENTIFY BIOPSY SITE ARE

Ie

RESIZE etc,.

PRESENT BIOPSY SITE ACCORDING TO USER-SPECIFIED LEVEL OF GRANULARITY

: CANDIDATE OF BIOPSY SITE

FIG. 6

Iec

6×6

RESIZE ACCORDING TO
USER-SPECIFIED LEVEL
OF GRANULARITY

Ie

4×4

START

S11
ACQUIRE CAPTURED IMAGE

S12
GENERATE N MASK IMAGES
WITH DIFFERENT LEVELS OF GRANULARITY

S13
GENERATE BIOPSY SITE IDENTIFYING IMAGE
BASED ON N MASK IMAGES

S14
GENERATE GRANULARITY ADJUSTMENT
IMAGE ADJUSTED TO HAVE USER-SPECIFIED
LEVEL OF GRANULARITY

S15
DISPLAY CAPTURED IMAGE & INFORMATION
RELATING TO  BIOPSY SITE

S16
INSPECTION ENDED ?    No

Yes

END

IMAGE PROCESSING DEVICE, IMAGE PROCESSING METHOD AND STORAGE MEDIUM

This application is a National Stage Entry of PCT/JP2021/007346 filed on February 26, 2021, the contents of all of which are incorporated herein by reference, in their entirety.

TECHNICAL FIELD

The present disclosure relates to a technical field of an image processing device, an image processing method, and storage medium for processing images acquired in endoscopic inspection.

BACKGROUND ART

An endoscopic system for displaying images taken in the lumen of an organ is known. For example, Patent Literature 1 discloses a learning method of a learning model configured to output information relating to a lesion part included in a captured image data when the captured image data generated by the photographing device is inputted. Further, Non-Patent Literature 1 discloses a Feature Pyramid Networks which is an architecture of a neural network for performing an inference using multi-scale feature maps. In addition, Non-Patent Literature 2 discloses a UK guideline for collection of a biopsy site.

PRIOR ART DOCUMENTS

Patent Literature

Patent Literature 1: WO2020/003607

Non-Patent Literature

Non-Patent Literature 1: T.-Y. Lin, P. Dollar, R. Girshick, K. He, B. Hariharan, and S. Belongie. Feature pyramid networks for object detection, In CVPR, 2017.
Non-Patent Literature 2: Rebecca C Fitzgerald, Massimiliano di Pietro, Krish Ragunath, et al., British Society of Gastroenterology guidelines on the diagnosis and management of Barrett's oesophagus, https://www.bsg.org.uk/wp-content/uploads/2019/12/BSG-guidelines-on-the-diagnosis-and-management-of-Barretts-oesophagus.pdf, Oct. 28, 2013, P 17.

SUMMARY

Problem to be Solved by the Invention

When detecting an area of an attention part such as a lesion part from an image captured in an endoscopic inspection, there is an issue that it is difficult to detect the area depending on the attention part to be detected (e.g., flat lesion). In such a case, for example, when identifying the position of the lesion part in units of pixel, there is a case where the attention part to be detected cannot be detected correctly.

In view of the above-described issue, it is therefore an example object of the present disclosure to provide an image processing device, an image processing method, and a storage medium capable of suitably identifying an attention part such as a lesion part in an image captured in endoscope inspection.

Means for Solving the Problem

One mode of the image processing device is an image processing device including:
an acquisition means for acquiring a captured image acquired by photographing an inspection target by a photographing unit provided in an endoscope;
a mask image generation means for generating a plurality of mask images which indicate candidate areas of an attention part in the captured image by different levels of granularity; and
an identification means for identifying the attention part based on the plurality of the mask images.

One mode of the image processing method is an image processing method executed by a computer, the image processing method including:
acquiring a captured image acquired by photographing an inspection target by a photographing unit provided in an endoscope;
generating a plurality of mask images which indicate candidate areas of an attention part in the captured image by different levels of granularity; and
identifying the attention part based on the plurality of the mask images.

One mode of the storage medium is a storage medium storing a program executed by a computer, the program causing the computer to:
acquire a captured image acquired by photographing an inspection target by a photographing unit provided in an endoscope;
generate a plurality of mask images which indicate candidate areas of an attention part in the captured image by different levels of granularity; and
identify the attention part based on the plurality of the mask images.

Effect of the Invention

An example advantage according to the present invention is to suitably identify an attention part to be detected in an endoscopic image.

BRIEF DESCRIPTION OF THE DRAWINGS

FIG. 3 illustrates an outline of a process relating to extraction and display of a biopsy site area.
FIG. 6 is a diagram showing an outline of the process executed by a granularity adjustment unit.

EXAMPLE EMBODIMENTS

Hereinafter, an example embodiment of an image processing device, an image processing method, and a storage medium will be described with reference to the drawings.

First Example Embodiment

Figure 1:
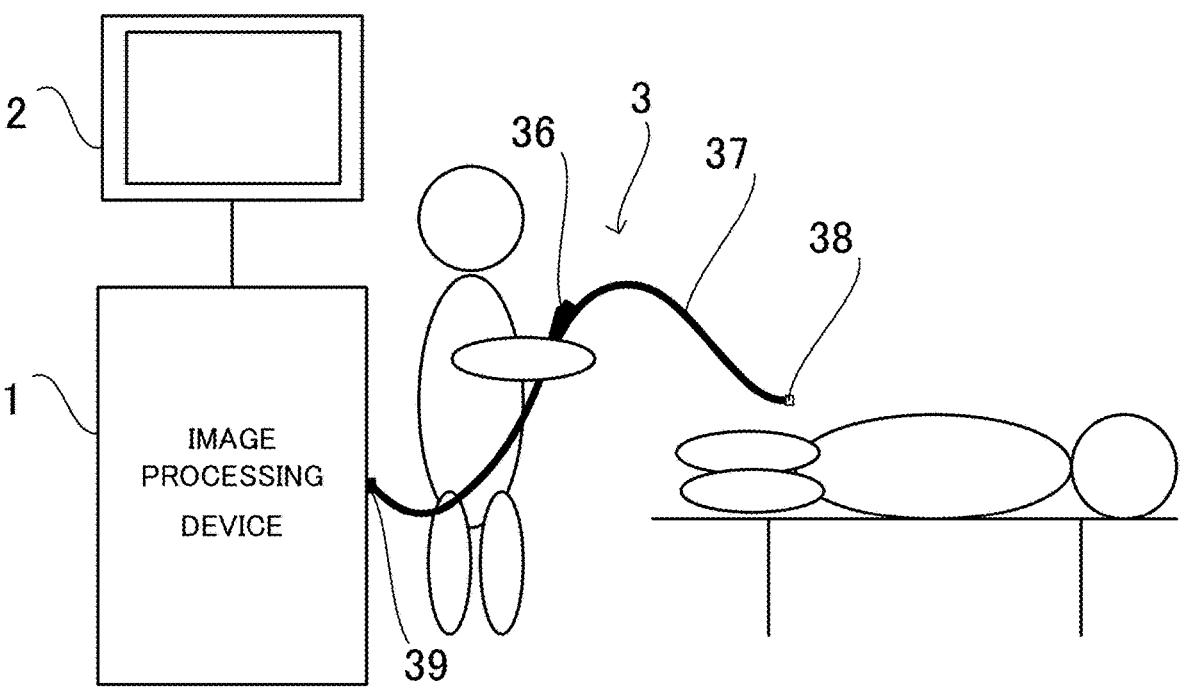
FIG. 1 illustrates the schematic configuration of an endoscopic inspection system.

FIG. 1 shows a schematic configuration of an endoscopic inspection system 100. As shown in FIG. 1, the endoscopic inspection system 100 is a system for presenting a candidate of the biopsy site (a target part of biopsy) to an inspector such as a doctor who performs inspection or treatment using an endoscope. The endoscopic inspection system 100 mainly includes an image processing device 1, a display device 2, and an endoscope 3 connected to the image processing device 1. The biopsy site is an example of "the attention part".

The image processing device 1 acquires an image (also referred to as "captured image Ia") captured by the endoscope 3 in time series from the endoscope 3 and displays a view based on the captured image Ia on the display device 2. The captured image Ia is an image captured at predetermined time intervals in at least one of the insertion process of the endoscope 3 to the subject or the ejection process of the endoscope 3 from the subject. In the present example embodiment, the image processing device 1 analyzes the captured image Ia to identify the biopsy site from the captured image Ia, and displays information relating to the identified biopsy site on the display device 2.

The display device 2 is a display or the like for displaying information based on a display signal supplied from the image processing device 1.

The endoscope 3 mainly includes an operation unit 36 for inspector to perform a predetermined input, a shaft 37 which has flexibility and which is inserted into the organ to be photographed of the subject, a pointed end unit 38 having a built-in photographing unit such as an ultra-small image pickup device, and a connecting unit 39 for connecting with the image processing device 1.

In the following description, as a representative example, the process in the endoscopic inspection of a large bowel will be described, but the inspection target may be not only the large bowel but also an esophagus or a stomach. Examples of the target endoscope in the present disclosure include a laryngendoscope, a bronchoscope, an upper digestive tube endoscope, a duodenum endoscope, a small bowel endoscope, a large bowel endoscope, a capsule endoscope, a thoracoscope, a laparoscope, a cystoscope, a cholangioscope, an arthroscope, a spinal endoscope, a blood vessel endoscope, and an epidural endoscope.

Figure 2:
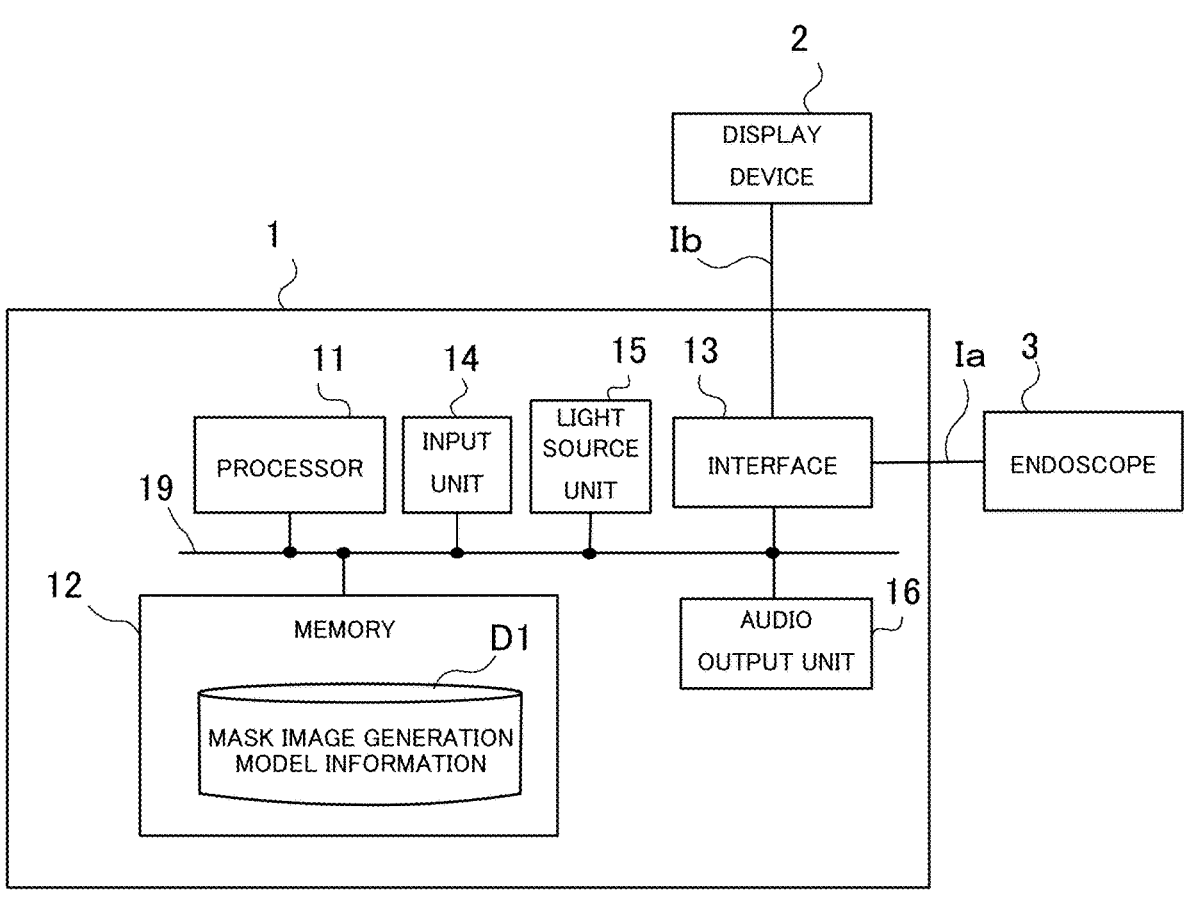
FIG. 2 illustrates a hardware configuration of an image processing device.

FIG. 2 shows the hardware configuration of the image processing device 1. The image processing device 1 mainly includes a processor 11, a memory 12, an interface 13, an input unit 14, a light source unit 15, and an audio output unit 16. Each of these elements is connected via a data bus 19.

The processor 11 executes a predetermined process by executing a program or the like stored in the memory 12. The processor 11 is one or more processors such as a CPU (Central Processing Unit), a GPU (Graphics Processing Unit), and a TPU (Tensor Processing Unit). The processor 11 may be configured by a plurality of processors. The processor 11 is an example of a computer.

The memory 12 is configured by a variety of volatile memories which is used as working memories, and non-volatile memories which stores information necessary for the process to be executed by the image processing device 1, such as a RAM (Random Access Memory) and a ROM (Read Only Memory). The memory 12 may include an external storage device such as a hard disk connected to or built in to the image processing device 1, or may include a storage medium such as a removable flash memory. The memory 12 stores a program for the image processing device 1 to execute each process in the present example embodiment. The memory 12 stores mask image generation model information D1.

The mask image generation model information D1 is information relating to a model (also referred to as "mask image generation model") configured to generate a mask image that is an image representing a biopsy site in the captured image Ia. The mask image generation model information D1 includes, for example, parameters necessary to configure the mask image generation model. The mask image generation model is an arbitrary machine learning model or a statistical model that is learned so as to output a plurality of mask images which indicate candidate areas of a biopsy site in the inputted captured image Ia by different levels of granularity (i.e., resolutions) when the captured image Ia is inputted thereto. When the mask image generation model is configured by a neural network, the mask image generation model information D1 includes various parameters relating to, for example, a layer structure, a neuron structure of each layer, the number of filters and a filter size in each layer, and the weight of each element of each filter. In the present example embodiment, it is assumed, by way of example, that the mask image generation model is Feature Pyramid Networks. Details of the mask image generation model will be described later with reference to FIG. 3.

The mask image generation model information D1 may be stored in an external device capable of data communication with the image processing device 1 by wired or wireless instead of the memory 12. The external device may be one or more server devices.

The interface 13 performs an interface operation between the image processing device 1 and an external device. For example, the interface 13 supplies the display information "Ib" generated by the processor 11 to the display device 2. Further, the interface 13 supplies the light generated by the light source unit 15 to the endoscope 3. The interface 13 also provides an electrical signal to the processor 11 indicative of the captured image Ia supplied from the endoscope 3. The interface 13 may be a communication interface, such as a network adapter, for wired or wireless communication with the external device, or a hardware interface compliant with a USB (Universal Serial Bus), a SATA (Serial AT Attachment), or the like.

The input unit 14 generates an input signal based on the operation by the inspector. Examples of the input unit 14 include a button, a touch panel, a remote controller, and a voice input device. As will be described later, the input unit 14 receives an input (external input) for specifying the level of granularity of the biopsy site to be displayed. The light source unit 15 generates light for supplying to the pointed end unit 38 of the endoscope 3. The light source unit 15 may also incorporate a pump or the like for delivering water and air to be supplied to the endoscope 3. The audio output unit 16 outputs a sound under the control of the processor 11.

Next, a specific description will be given of the process relating to identification and display of the biopsy site by the image processing device 1.

FIG. 3 is a diagram illustrating an outline of a process relating to extraction and display of a biopsy site area.

First, on the basis of the mask image generation model configured by the mask image generation model information D1, the image processing device 1 generates a plurality of mask images "Im1" to "ImN" (N is an integer of 2 or more) having different levels of granularity from the captured image Ia.

The mask images Im1 to ImN are images each showing the reliability of being the biopsy site on a grid-by-grid basis. Here, the grid is a virtual area acquired by dividing the captured image Ia into grid shapes, and is a rectangular area corresponding to a plurality of pixels of the captured image Ia. Each of the mask images Im1 to ImN may be an image showing a heat map (reliability map) of the reliability described above on the captured image Ia, or may be a binary image indicating whether or not each grid corresponds to a biopsy site. As an exemplary case, FIG. 3 shows the mask images Im1 to ImN each of which is a binary image in which the pixels corresponding to the biopsy site is white and the other pixels are black.

Then, the mask images Im1 to ImN have different levels of granularity (resolutions) representing the reliability of being the biopsy sites, and have the numbers of grids depending on the levels of granularity. For example, the mask image Im1 is an image with the 4-by-4 grids in the vertical and horizontal directions, and the mask image Im2 is an image with the 8-by-8 grids in the vertical and horizontal directions.

Next, the image processing device 1 generates an image (also referred to as a "biopsy site identifying image Ie") in which a biopsy site is identified, by selecting from or integrating the N mask images Im1 to ImN, which have different levels of granularity, based on a predetermined algorithm. In FIG. 3, as an example, the image processing device 1 selects the mask image Im1 as the biopsy site identifying image Ie.

Then, the image processing device 1 presents the identified biopsy site according to the level of granularity specified by the user through the input unit 14 or the like. Here, as an example, a level of granularity of 6-by-6 is specified, and the image processing device 1 converts the biopsy site identifying image Ie (here, a mask image with 4-by-4 grids) into a mask image with 6-by-6 grids. Then, on the basis of the converted mask image, the image processing device 1 highlights the identified biopsy site on the captured image Ia according to the specified level of granularity. Thus, the image processing device 1 can suitably present the candidate of the biopsy site to the user. The image processing device 1 may display an image representing the identified biopsy site separately from the captured image Ia instead of displaying the identified biopsy site on the captured image Ia. This display example will be described with reference to FIG. 7.

Here, a mask image generation model will be supplementally described. The mask image generation model has a network architecture based on Feature Pyramid Networks. In this case, the mask image generation model generates multi-scale feature maps (i.e., tensors acquired by convolution) by performing a convolution on the captured image Ia that is an input image, and infers (i.e., generates mask images with different levels of granularity in the present example embodiment) the biopsy site for each of the feature maps. The number of mask images to be outputted by the mask image generation model and the level of granularity (resolution) of each mask image are preset in the learning stage. Then, such a mask image generation model is learned in advance based on training data, and the learned parameters are stored in the mask image generation model information D1. The training data is sets of a plurality of mask images that are used as correct answer data and captured images that are used as input images. In learning, for example, the parameters of the mask image generation model are determined by the gradient descent method, the error back propagation method, or the like so that the error (loss) between the output by the mask image generation model when the input image is inputted thereto and the correct answer data is minimized.

It is noted that the mask image generation model is not limited to Feature Pyramid Networks and may be any other learning model configured to output mask images having different levels of granularity when an image is inputted thereto. Examples of architectures of such a neural network include the Featurized Image Pyramid Network, which is configured to perform an inference on plural images which are generated by resizing an inputted captured image Ia to a plurality of resolutions.

Figure 4:
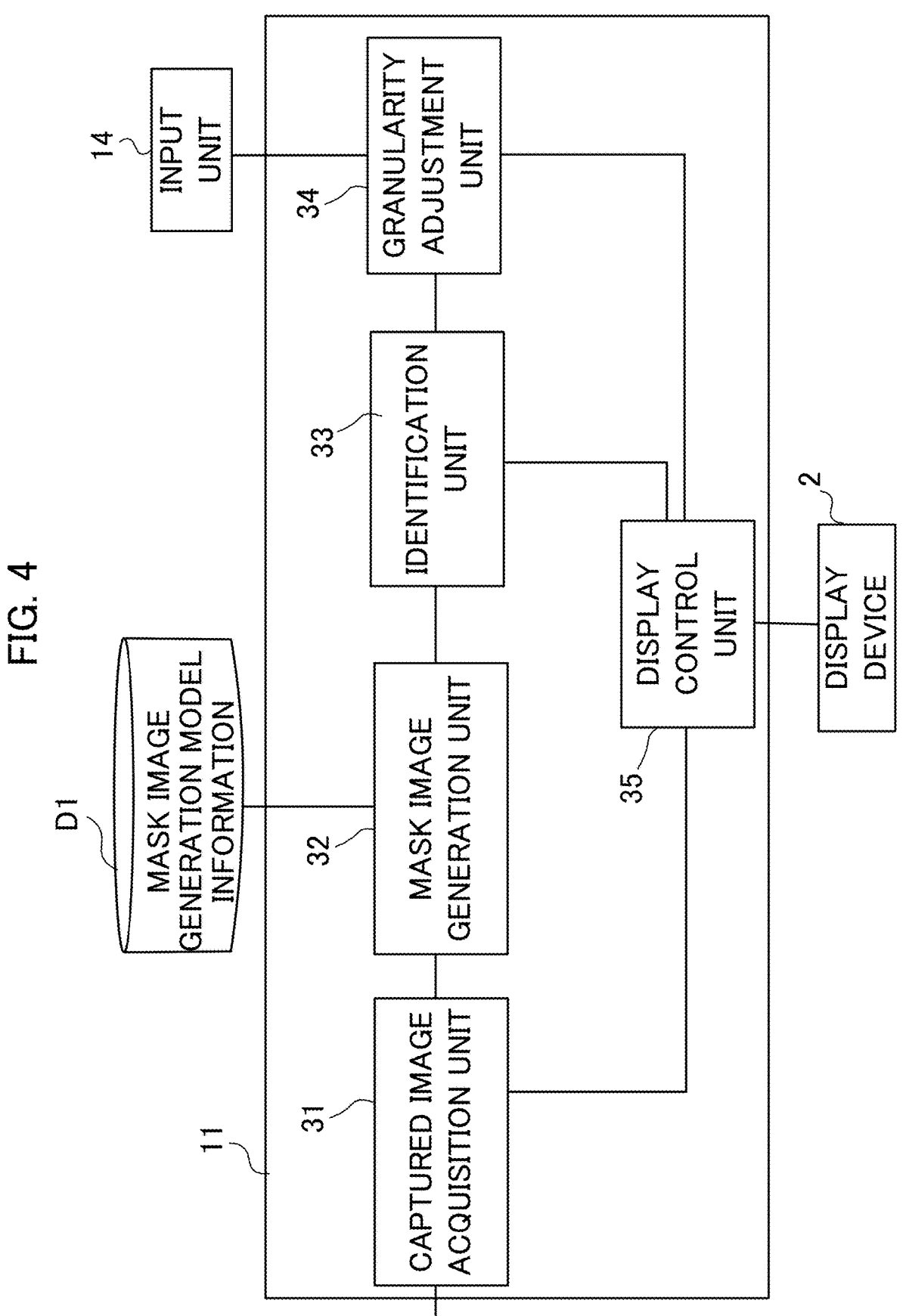
FIG. 4 illustrates a functional block of the image processing device.

FIG. 4 is an example of a functional block of the image processing device 1. As shown in FIG. 4, the processor 11 of the image processing device 1 functionally includes a captured image acquisition unit 31, a mask image generation unit 32, an identification unit 33, a granularity adjustment unit 34, and a display control unit 35. In FIG. 4, each combination of the blocks to exchange data with each other are connected by solid line. However, the combinations of blocks to exchange data with each other are not limited as shown in FIG. 4. It is true for the other functional block diagrams to be described later.

The captured image acquisition unit 31 acquires the captured image Ia captured by the endoscope 3 via the interface 13 at predetermined intervals. Then, the captured image acquisition unit 31 supplies the acquired captured image Ia to the mask image generation unit 32, the granularity adjustment unit 34, and the display control unit 35, respectively.

The mask image generation unit 32 acquires the captured image Ia supplied from the captured image acquisition unit 31 and inputs the captured image Ia to the mask image generation model configured by the mask image generation model information D1, thereby generating the mask images Im1 to ImN.

The identification unit 33 identifies the biopsy site based on the mask images Im1 to ImN generated by the mask image generation unit 32. As an example, the identification unit 33 generates the biopsy site identifying image Ie based on the mask images Im1 to ImN. Then, the identification unit 33 identifies the biopsy site based on the biopsy site identifying image Ie. In this case, the identification unit 33 may select one mask image from the mask images Im1 to ImN as the biopsy site identifying image Ie, or may generate the biopsy site identifying image Ie by integrating the mask images Im1 to ImN or a part of them. Specific examples of the process executed by the identification unit 33 will be described later.

The granularity adjustment unit 34 converts the biopsy site identifying image Ie supplied from the identification unit 33 into an image (also referred to as "granularity adjustment image Iec") adjusted to have the level of granularity (i.e., the number of vertical and horizontal grids) specified by the user. In this case, the granularity adjustment unit 34, for example, acquires information specifying the level of granularity from the input unit 14, and then, on the basis of the level of granularity indicated by the acquired information, the granularity adjustment unit 34 generates the granularity adjustment image Iec. It is noted that the configuration information indicative of the level of granularity specified by the user or the default level of granularity may be stored in advance in the memory 12 or the like. In this case, the granularity adjustment unit 34 generates the granularity adjustment image Iec by referring to the above-described configuration information from the memory 12 or the like. The generation of the granularity adjustment image Iec by the granularity adjustment unit 34 will be supplementally described with reference to FIG. 6. The process by the granularity adjustment unit 34 is a process performed when there is a designation or setting by the user of the level of granularity to be used for display, and therefore it is not an essential process.

The display control unit 35 generates a display information Ib based on the granularity adjustment image Iec generated by the granularity adjustment unit 34, if there is a designation or setting by the user of the level of granularity to be used for display. Then, the display control unit 35 supplies the generated display information Ib to the display device 2 to thereby cause the display device 2 to display the information on the biopsy site area. On the other hand, if there is no designation or setting by the user of the level of granularity to be used for display, the display control unit 35 generates a display information Ib based on the biopsy site identifying image Ie. Then, the display control unit 35 supplies the generated display information Ib to the display device 2 to thereby cause the display device 2 to display the information on the biopsy site area. The display example displayed on the display device 2 by the display control unit 35 will be described later with reference to FIG. 7.

Here, for example, each component of the captured image acquisition unit 31, the mask image generation unit 32, the identification unit 33, the granularity adjustment unit 34, and the display control unit 35 can be realized by the processor 11 executing a program. In addition, the necessary program may be recorded in any non-volatile storage medium and installed as necessary to realize the respective components. In addition, at least a part of these components is not limited to being realized by a software program and may be realized by any combination of hardware, firmware, and software. At least some of these components may also be implemented using user-programmable integrated circuitry, such as FPGA (Field-Programmable Gate Array) and microcontrollers. In this case, the integrated circuit may be used to realize a program for configuring each of the above-described components. Further, at least a part of the components may be configured by a ASSP (Application Specific Standard Produce), ASIC (Application Specific Integrated Circuit) and/or a quantum processor (quantum computer control chip). In this way, each component may be implemented by a variety of hardware. The above is true for other example embodiments to be described later. Further, each of these components may be realized by the collaboration of a plurality of computers, for example, using cloud computing technology.

Figure 5A:
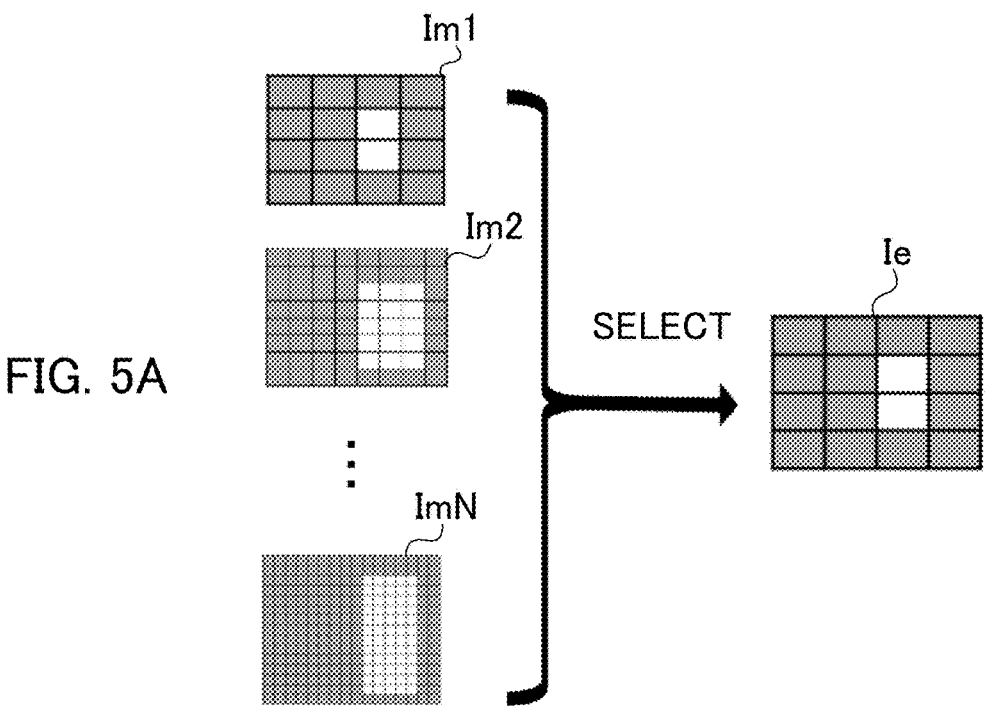
FIG. 5A is a diagram showing an outline of a process of selecting a mask image as a biopsy site identifying image.
Figure 5B:
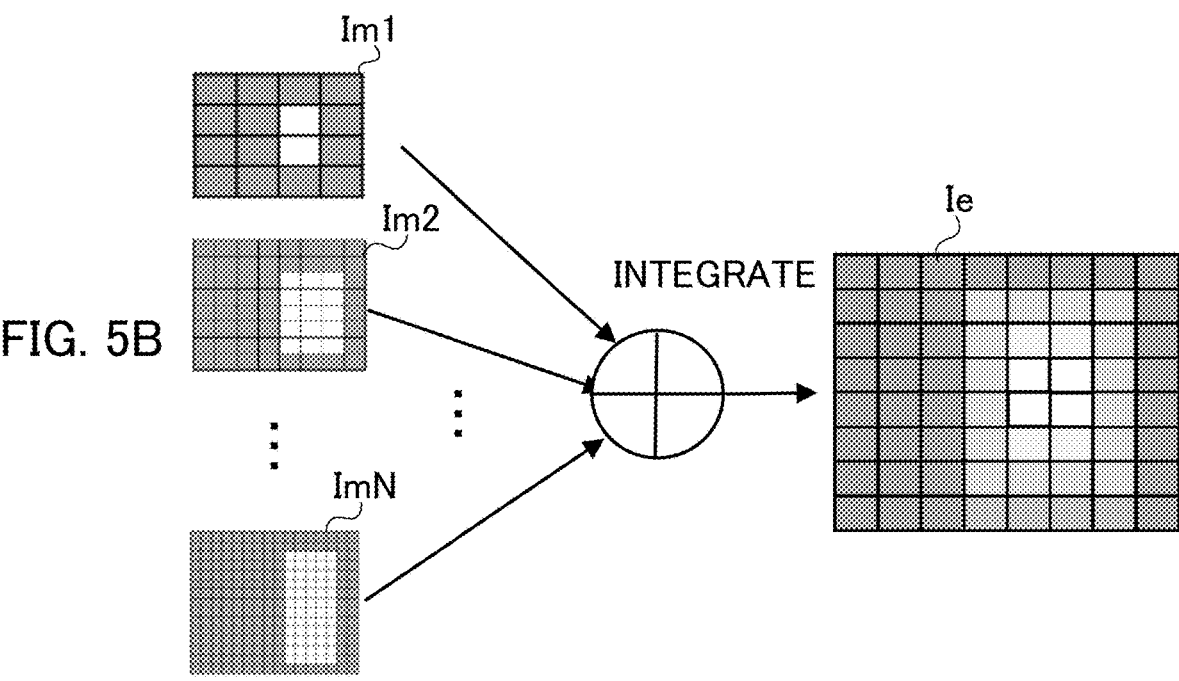
FIG. 5B is a diagram showing an outline of a process of generating a biopsy site identifying image which incorporates the mask images.

First, an approach for generating a biopsy site identifying image Ie by the identification unit 33 will be specifically described. FIG. 5A illustrates an outline of a process of selecting one mask image from the mask images Im1 to ImN as a biopsy site identifying image Ie. FIG. 5B illustrates the outline of the process of generating biopsy site-identifying images Ie by integrating mask images Im1 to ImN.

First, an approach for selecting a mask image to be a biopsy site identifying image Ie (see FIG. 5A) will be described.

In the first example relating to the selection of the biopsy site identifying image Ie, the identification unit 33 specifies the maximum score for each mask image when each mask image represents the score of the reliability of being the biopsy site for each grid, and selects the mask image having the largest maximum score as the biopsy site identifying image Ie. Here, reliability is an index representing the likelihood that there is a biopsy site, and the higher the reliability is, the higher the likelihood that there is a biopsy site becomes. In this way, the identification unit 33 can select the mask image having the highest reliability as the biopsy site identifying image Ie.

In the second example relating to the selection of the biopsy site identifying image Ie, the identification unit 33 calculates the degree of similarity for each pair selected from the mask images Im1 to ImN and selects the biopsy site identifying image Ie based on the degree of similarity. Here, the identification unit 33 may calculate the degree of similarity described above using any image similarity index such as MSE (Mean Squared Error) and SSIM (Structural Similarity Index Measure).

Specifically, the identification unit 33 identifies such a mask image that is an outlier based on the degree of similarity, and excludes the identified mask image from candidates of the selection of the biopsy site identifying image Ie. In this case, for example, the identification unit 33 excludes, from the candidates of the selection of the biopsy site identifying image Ie, such a mask image that the average value of the degrees of similarity with other mask images is smaller than a predetermined value. Then, the identification unit 33 selects, from the remaining mask images, a mask image having the lowest level of granularity (i.e., lowest resolution) as the biopsy site identifying image Ie, for example.

In the second example relating to the selection of the biopsy site identifying image Ie, instead of identifying a mask image that is an outlier based on the degrees of similarity of the pairs among the mask images Im1 to ImN, the identification unit 33 may perform clustering of the mask images Im1 to the ImN based on the degrees of similarity and select the biopsy site identifying image Ie from the largest cluster having the largest number of the mask images. In this case, the identification unit 33 may perform clustering using any clustering technique such as a x-means method. Then, the identification unit 33 selects a mask image having the lowest level of granularity (that is, the lowest resolution) as the biopsy site identifying image Ie from the largest cluster having the largest number of the mask images.

Next, an approach for generating a biopsy site specified image Ie by integrating the mask images Im1 to ImN (see FIG. 5B) will be described.

In this case, the identification unit 33 resizes the mask images Im1 to ImN so as to have a common level of granularity, and generates a biopsy site identification image Ie in which the resized mask image Im1 to ImN are averaged (or summed) for each corresponding grid. In the example of FIG. 5B, the identification unit 33 firstly converts the mask images Im1 to ImN into mask images having the common level of granularity (i.e., common number of grids) of 8-by-8 grids, and then generates a biopsy site identifying image Ie with the level of granularity of 8-by-8 grids into which the converted mask images are integrated.

The identification unit 33 may set weights "w1" to "wN" for each of the mask images Im1 to ImN and calculate, using these weights, a weighted average thereof to generate the biopsy site identifying image Ie. The weights w1 to wN in this case may be predetermined values or may be each set to a value in accordance with the maximum score of the degrees of reliability for grids of each mask image.

Further, the identification unit 33 may select mask images to be integrated from the mask images Im1 to ImN based on the degrees of similarity among the mask images Im1 to ImN. In this case, for example, the identification unit 33 identifies such a mask image that is an outlier based on the degrees of similarity, and integrates the mask images other than the identified mask image to thereby generate the biopsy site identifying image Ie. In another example, the identification unit 33 performs the clustering of the mask images by the above-described clustering method and identifies the largest cluster having the largest number of the mask images to thereby generates the biopsy site identifying image Ie into which the identified mask images that constitutes the largest cluster are integrated. Thereby, the identification unit 33 preferably excludes such a mask image including an error due to disturbance or the like, and can generate a biopsy site identifying image Ie representing an area to be a candidate of the biopsy site with a high degree of accuracy.

Figure 6:
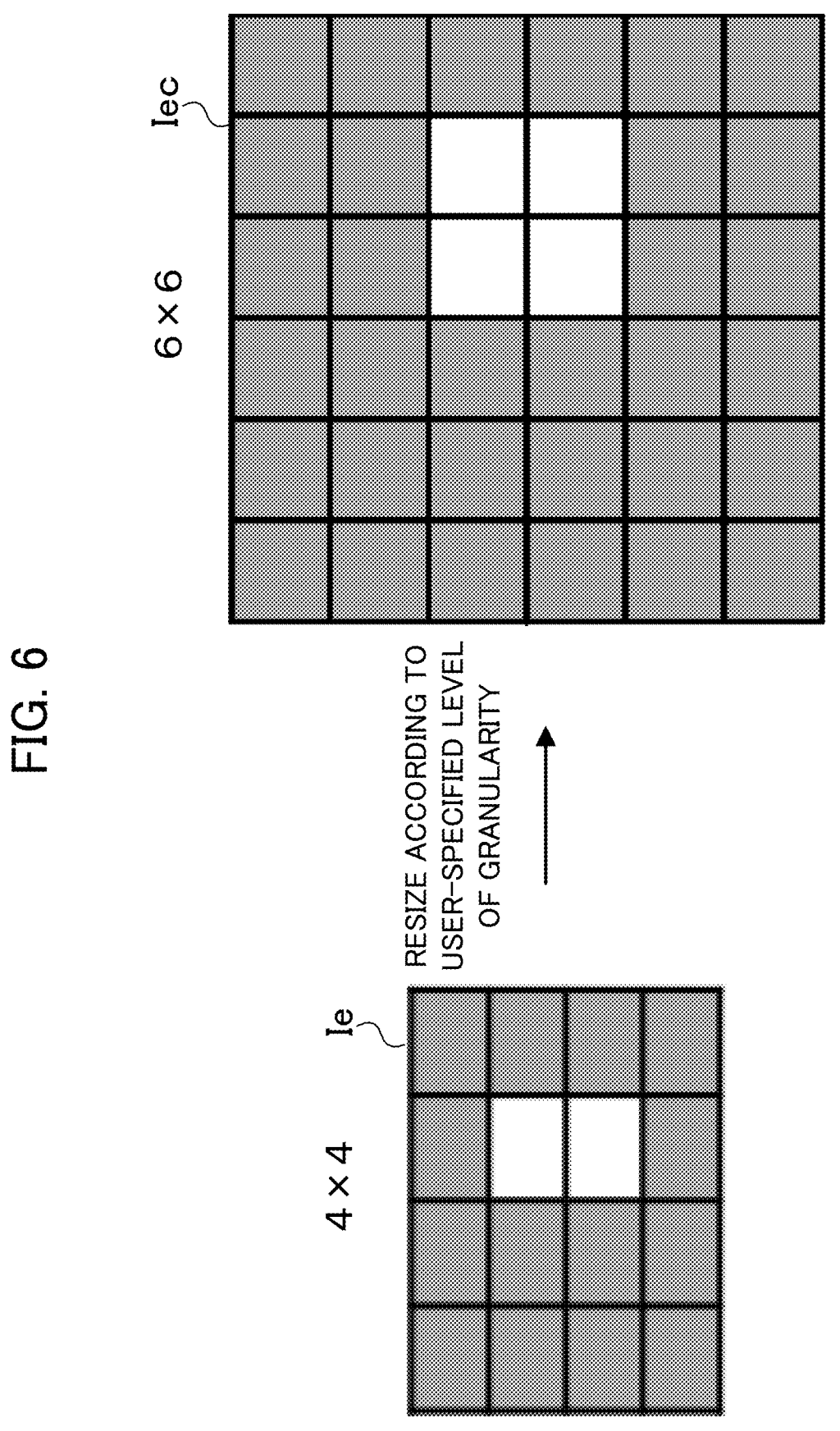

Next, the generation of the granularity adjustment image Iec will be described. FIG. 6 illustrates an outline of the process executed by the granularity adjustment unit 34. In FIG. 6, the granularity adjustment unit 34 converts the biopsy site identifying image Ie with the level of granularity of 4-by-4 grids into a granularity adjustment image Iec with 6-by-6 grids that is the level of granularity specified by the user.

In this case, the granularity adjustment unit 34 performs conversion process shown in FIG. 6 using an arbitrary image resizing technique. For example, with respect to each mask image, the granularity adjustment unit 34 defines a two-dimensional coordinate system with a common value range in which one of the four corners of the image is determined as the origin, and determines the coordinate value (e.g., the coordinate value of the center) of each grid in the biopsy site identifying image Ie and the granularity adjustment image Iec. Then, the granularity adjustment unit 34 determines the value (score) of each grid of the granularity adjustment image Iec to be the value of a grid of the biopsy site identifying image Ie with the coordinate value closest to the each grid of the granularity adjustment image Iec. The granularity adjustment unit 34 may determine the value of each grid of the granularity adjustment image Iec from the values of grids of the plurality of biopsy sites identifying images Ie by calculating the weighted average based on their coordinate values.

Figure 7:
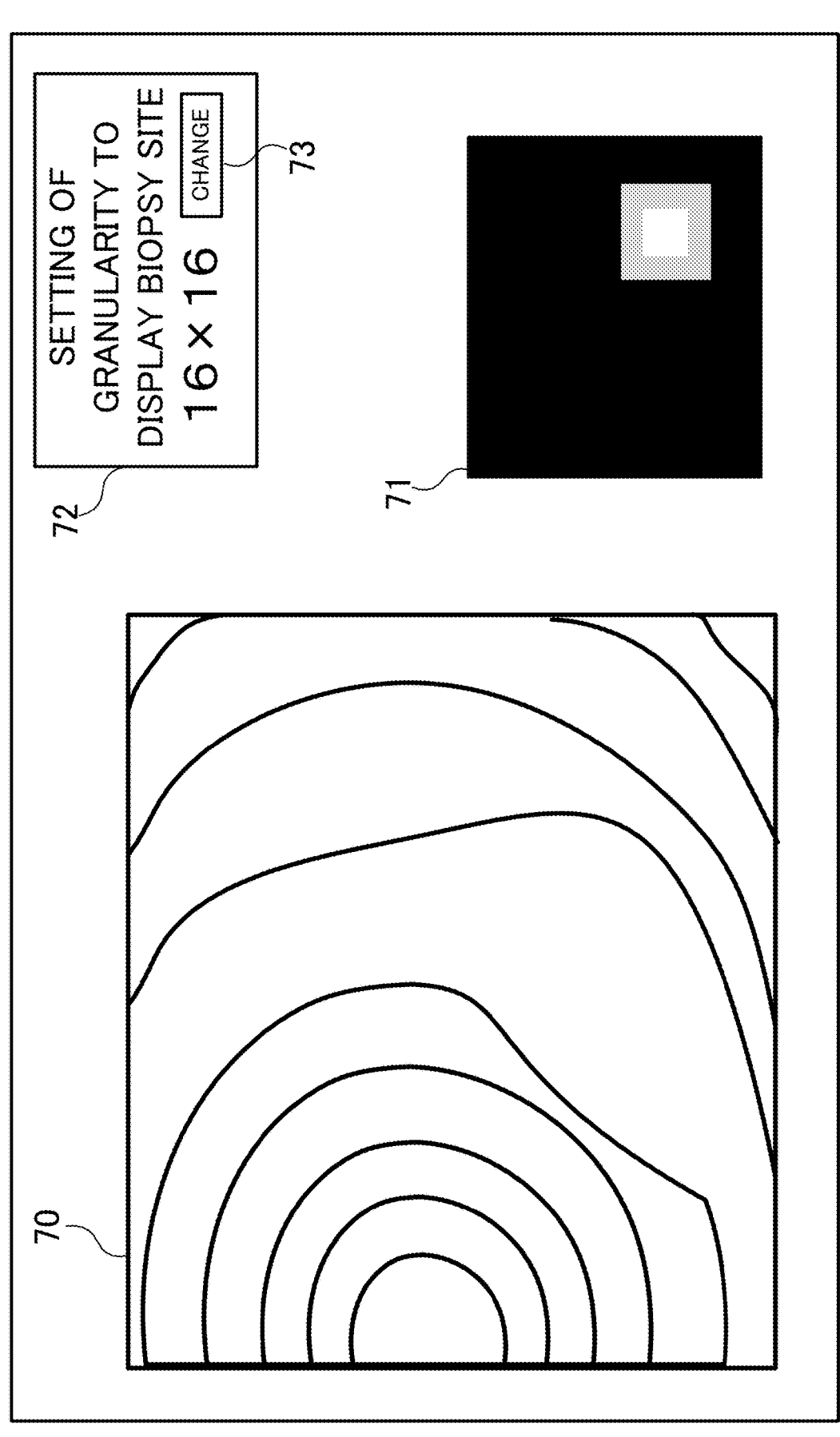
FIG. 7 illustrates a display example of the display view displayed on a display device in endoscopic inspection.

Next, a description will be given of the display control of the display device 2 to be executed by the display control unit 35. FIG. 7 shows a display example of a display view displayed on the display device 2 in endoscopic inspection. The display control unit 35 of the image processing device 1 causes the display device 2 to display the display view shown in FIG. 7, by transmitting the display information Ib which is generated based on the granularity adjustment image Iec generated by the granularity adjustment unit 34 and the captured image Ia acquired by the captured image acquisition unit 31.

In the example of FIG. 7, the display control unit 35 of the image processing device 1 displays on the display view a latest captured image 70, a biopsy site map 71, and a granularity display area 72. The display control unit 35 displays a moving image based on the latest captured image Ia acquired by the captured image acquisition unit 31 as the latest captured image 70. Further, the display control unit 35 displays the biopsy site map 71 based on the granularity adjustment image Iec acquired from the granularity adjustment unit 34. In this case, the display control unit 35 may display, as the biopsy site map 71, the granularity adjustment image Iec as it is, or may display, as the biopsy site map 71, an image acquired by performing a predetermined process on the granularity adjustment image Iec. In the latter example, for example, the display control unit 35 may perform the process for converting the granularity adjustment image Iec into a binary image or 3 or an image with gradation of more than two levels.

It is noted that the display control unit 35 may display information corresponding to the biopsy site map 71 over the latest captured image 70. In this case, the display control unit 35 may display a heat map based on the granularity adjustment image Iec over the biopsy site map 71, or may display the granularity adjustment image Iec in such a state that the area in which the value in the granularity adjustment image Iec is equal to or larger than a predetermined threshold value is highlighted by edging effect. In this way, the display control unit 35 may display an image based on the granularity adjustment image Iec.

Further, the display control unit 35 displays, on the granularity display area 72, the current setting of the level of granularity (here 16-by-16 grids), and displays a change button 73 for instructing the setting change of the level of granularity. Then, when detecting that the change button 73 is selected, the display control unit 35 accepts an input for specifying the level of granularity to be set through the input unit 14. In this case, on the basis of the audio input signal acquired by the input unit 14, the display control unit 35 may accept the designation of the level of granularity to be set. In this case, the display control unit 35 may determine, without providing the change button 73, the necessity of the setting change of the level of granularity and the level of granularity after the change.

According to the display view shown in FIG. 7, the image processing device 1 suitably presents an area to be a candidate for a biopsy site to an inspector, and can support the implementation of efficient and effective biopsy. In this case, the image processing device 1 can suitably present a candidate of the biopsy site to the inspector in accordance with the level of granularity specified by the user.

Figure 8:
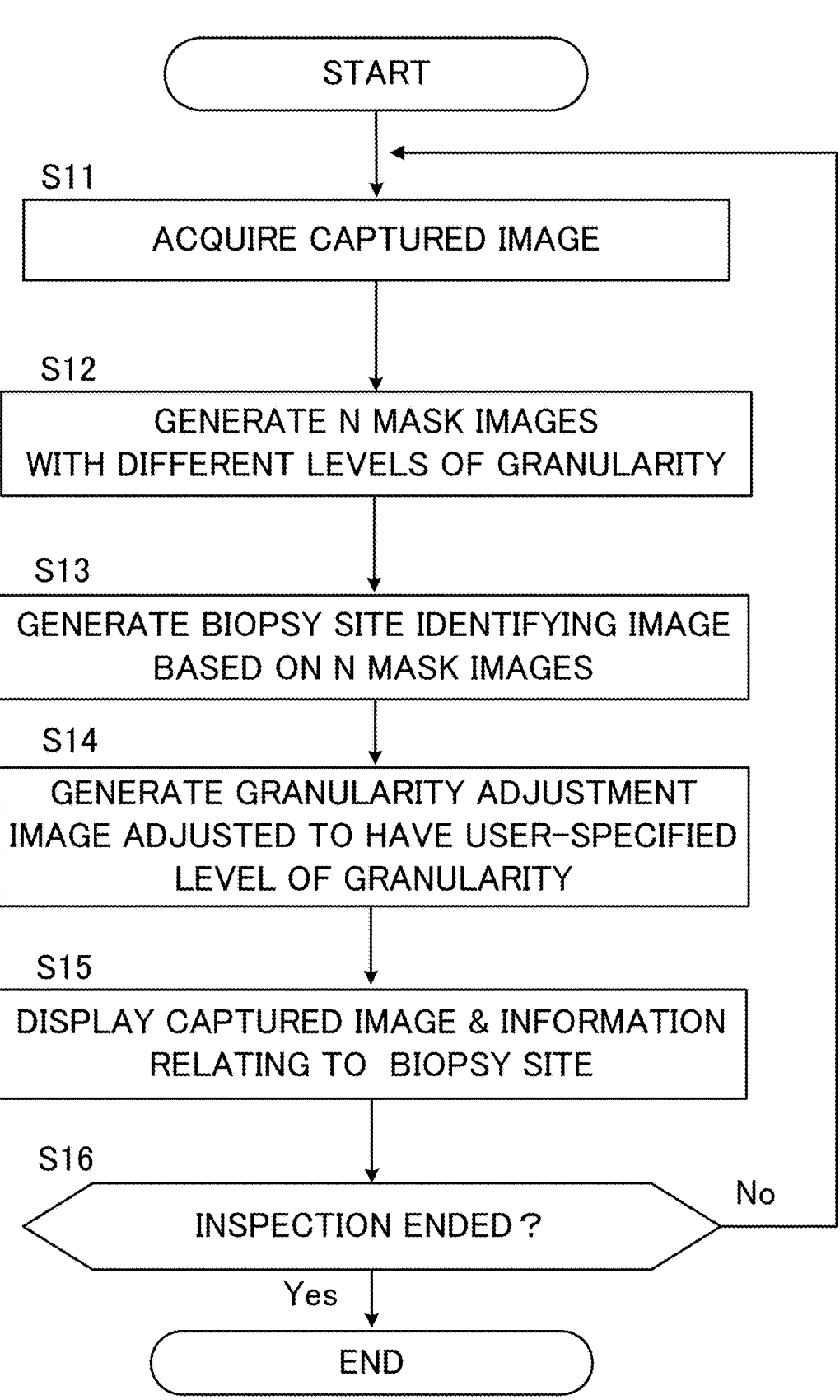
FIG. 8 is an example of a flowchart showing an outline of a process performed by the image processing device during the endoscopic inspection in the first example embodiment.

FIG. 8 is an example of a flowchart showing an outline of the process performed by the image processing device 1 during the endoscopic inspection according to the first example embodiment.

First, the captured image acquisition unit 31 of the image processing device 1 acquires the captured image Ia (step S11). In this case, the captured image acquisition unit 31 of the image processing device 1 receives the captured image Ia from the endoscope 3 via the interface 13.

Next, the mask image generation unit 32 of the image processing device 1 generates N mask images Im1 to ImN having different levels of granularity from the captured image Ia acquired at step S11 by using the mask image generation model configured by the mask image generation model information D1 (step S12). Then, the identification unit 33 generates a biopsy site identifying image Ie, which is a mask image indicating an area of the biopsy site, based on the N mask images Im1 to ImN (step S13).

Then, the granularity adjustment unit 34 generates a granularity adjustment image Iec adjusted based on the user-specified level of granularity (step S14). Then, the display control unit 35 displays the captured image Ia acquired at step S11, and information relating to the biopsy site on the display device 2 (step S15). In this case, the display control unit 35 displays the granularity adjustment image Iec or an image based on the granularity adjustment image Iec on the display device 2 as information relating to the biopsy site. Thereby, the display control unit 35 can suitably present the existence and the position of the specified biopsy site according to the level of granularity specified by the user.

It is noted that the user may input information regarding the change of the level of granularity in response to the view of the biopsy site identifying image Ie displayed on the display device 2. In this case, the display control unit 35 displays the biopsy site identifying image Ie on the display device 2 after step S13. Then, when the granularity adjustment unit 34 detects the input regarding the change of the level of granularity through the input unit 14, the display control unit 35 generates at step S14 the granularity adjustment image Iec based on the user-specified level. Then, at step S15, the display control unit 35 displays, on the display device 2, the captured image Ia acquired at step S11 and information relating to the biopsy site.

Then, the image processing device 1 determines whether or not the endoscopic inspection has ended (step S16). For example, the image processing device 1 determines that the endoscopic inspection has ended when a predetermined input or the like is detected through the input unit 14 or the operation unit 36. Then, when determining that the endoscopic inspection has ended (step S16; Yes), the image processing device 1 ends the process of the flowchart. On the other hand, when determining that the endoscopic inspection has not ended (step S16; No), the image processing device 1 returns the process to step S11. Then, the image processing device 1 executes the process at step S11 to step S16 for the captured image Ia newly generated by the endoscope 3.

Next, a supplementary description will be given of technical effects in this example embodiment.

Generally, the selection of the biopsy site is very important for the determination of the medical condition such as cancers, while there is an issue that the selection of the biopsy site of a flat lesion is difficult. In order to avoid the inspection error due to the difference in the doctor's selection skill of the biopsy site, according to the standard inspection technique of the Barrett esophagus in the United Kingdom, such a biopsy sampling method is adopted that the biopsy site is collected at fixed intervals. On the other hand, in such a biopsy sampling method, the number of sampling points becomes large, which leads to increase of the trouble of the doctor that is an inspector, increase of the burden of the patient, and increase of the biopsy inspection cost (see Non-Patent Literature 2). On the other hand, in the conventional lesion area extraction technique, the area extraction in units of pixel is carried out, and it is also an option to present the biopsy site using this technique. However, with this technique, there is an issue that sufficient extraction accuracy cannot be acquired for places where it is difficult to make a correct judgement even by a doctor such as a flat lesion.

In view of the above, in the present example embodiment, the image processing device 1 divides the captured image Ia into grids according to a plurality of patterns, and identifies the biopsy site based on the mask images Im1 to ImN that is the detection result of the biopsy site for each grid pattern. Thereby, even for locations that are difficult to make a correct judgement even by a doctor such as a flat lesion, the biopsy site can be identified with appropriate accuracy, and it can be suitably presented to the inspector as a candidate for the biopsy site. Therefore, in this case, it is possible to support the execution of efficient and effective biopsy. Further, the image processing device 1 can suitably present the biopsy site area to the inspector according to the level of granularity specified by the user, thereby enhancing the user's convenience.

Next, a modification suitable for the above-described example embodiment will be described. The following modifications may be applied in combination to the example embodiments described above.

First Modification

The image processing device 1 may process the moving image data configured by the captured images Ia generated during endoscopic inspection after the inspection.

For example, the image processing device 1 sequentially performs the process according to the flowchart in FIG. 8 with respect to each captured image Ia in the time series constituting the moving image data when the moving image data to be processed is specified based on the user input or the like through the input unit 14 at an arbitrary timing after the inspection. When it is determined at step S16 that the process of the target moving image data has ended, the image processing device 1 terminates the processing of the flowchart. In contrast, when it is determined that the process of the target moving image data has not ended, the image processing device 1 returns the process to step S11 and performs process according to the flowchart for the next captured image Ia in the time series.

Second Modification

The image processing device 1 may output information on the presence or absence of the biopsy site instead of or in addition to the control for outputting information relating to the position of the biopsy site on the captured image Ia.

In this case, for example, the display control unit 35 functions as an output control unit for controlling the output of the display and sound, and not only controls the display of the display device 2 based on the example embodiment described above, but also determines the presence or absence of the biopsy site based on the biopsy site identifying image Ie or granularity adjustment image Iec to thereby control the audio output unit 16. In this case, for example, the display control unit 35 determines that the biopsy site is present if there is any grid, in the biopsy site identifying image Ie or the granularity adjustment image Iec, whose value of the reliability of the presence of the biopsy site is equal to or larger than a predetermined threshold value. Then, in this case, it instructs the audio output unit 16 to output a predetermined sound. The threshold value described above is stored, for example, in advance in the memory 12 or the like.

Incidentally, the image processing device 1 may display information relating to the presence or absence of the biopsy site instead of notifying the user of the information relating to the presence or absence of the biopsy site by sound. In this case, when it is determined that there is a biopsy site, the image processing device 1 may highlight the latest photographed image 70 by edging effect to notify the user that there is a biopsy site, for example.

As described above, in the present modification, the image processing device 1 suitably notifies the inspector of the presence or absence of the biopsy site. Thereby, it is possible to suitably suppress overlooking the biopsy site. According to the present modification, the image processing device 1 may output at least one of information relating to the presence or absence of the biopsy site or information relating to the position of the attention part in the captured image Ia.

Third Modification

The inspection target to be detected by the mask image generation model is not limited to a biopsy site, and it may be any attention part (point) that the inspector needs to notice. Examples of such an attention part include a lesion part, an inflammation part, a point with an operating mark or other cuts, a point with a fold or a protrusion, a point on the wall surface of the lumen where the pointed end unit 38 of the endoscope 3 tends to get contact (caught). For example, in the case of a lesion part, the condition of such a lesion part to be detected is exemplified as following (a) to (f).

(a) Head and neck: pharyngeal cancer, malignant lymphoma, papilloma (b) Esophagus: esophageal cancer, esophagitis, esophageal hiatal hernia, Barrett's esophagus, esophageal varices, esophageal achalasia, esophageal submucosal tumor, esophageal benign tumor (c) Stomach: gastric cancer, gastritis, gastric ulcer, gastric polyp, gastric tumor (d) Duodenum: duodenal cancer, duodenal ulcer, duodenitis, duodenal tumor, duodenal lymphoma (e) Small bowel: small bowel cancer, small bowel neoplastic disease, small bowel inflammatory disease, small bowel vascular disease (f) Large bowel: colorectal cancer, colorectal neoplastic disease, colorectal inflammatory disease; colorectal polyps, colorectal polyposis, Crohn's disease, colitis, intestinal tuberculosis, hemorrhoids Then, the mask image generation model is learned to output mask images indicative of a predetermined attention part by different levels of granularity when a captured image Ia is inputted thereto. Then, the mask image generation unit 32 of the image processing device 1 generates the mask images Im1 to ImN relating to the attention point from the captured image Ia using such a mask image generation model, and the identification unit 33 generates the mask image which is selected from the mask images Im1 to ImN or the mask images are integrated into. Then, the granularity adjustment unit 34 changes the level of granularity of the mask image so as to conform to a user-specified level of granularity, and the display control unit 35 displays the attention point on the basis of the mask image generated by the granularity adjustment unit 34. Even in this case, the image processing device 1 can also suitably present an attention point to the inspector. Also in this modification, it achieves the same effect as the effect in the extraction of the biopsy site described in the first example embodiment before the present modification.

Second Example Embodiment

Figure 9:
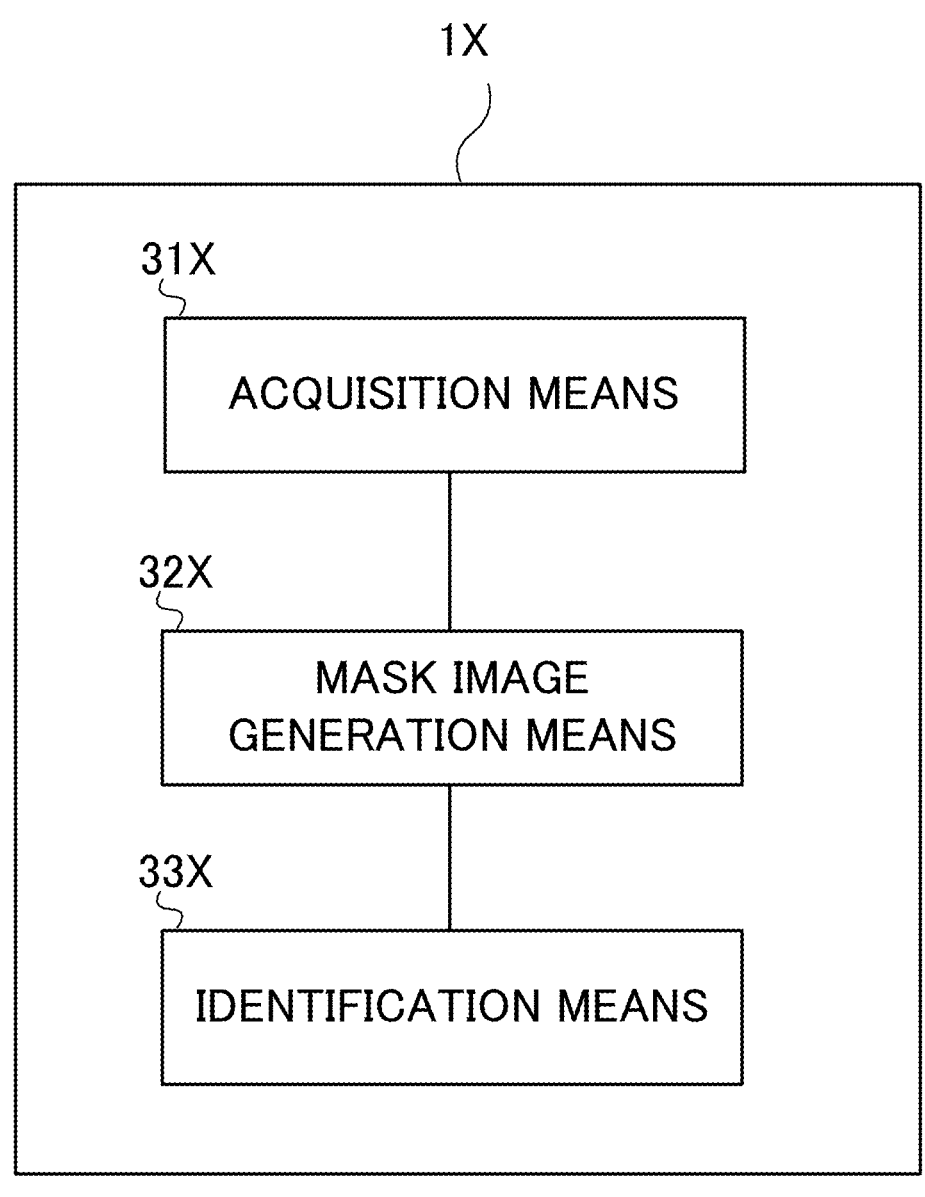
FIG. 9 is a block diagram of an image processing device according to the second example embodiment.

FIG. 9 is a block diagram of the image processing device 1X according to the second example embodiment. The image processing device 1X includes an acquisition means 31X, a mask image generation means 32X, and an identification means 33X. The image processing device 1X may be configured by a plurality of devices.

The acquisition means 31X acquires a captured image acquired by photographing an inspection target by a photographing unit provided in an endoscope. The acquisition means 31X may be the captured image acquisition unit 31 in the first example embodiment (including a modification, the same is applied hereinafter). The acquisition means 31X may immediately acquire the captured image generated by the photographing unit or may acquire, at a predetermined timing, the captured image stored in the storage device generated in advance by the photographing unit.

The mask image generation means 32X generates a plurality of mask images which indicate candidate areas of an attention part in the captured image by different levels of granularity. The mask image generation means 32X may be, for example, the mask image generation unit 32 according to the first example embodiment.

The identification means 33X identifies the attention part based on the plurality of the mask images. The identification means 33X may be, for example, the identification unit 33 in the first example embodiment.

Figure 10:
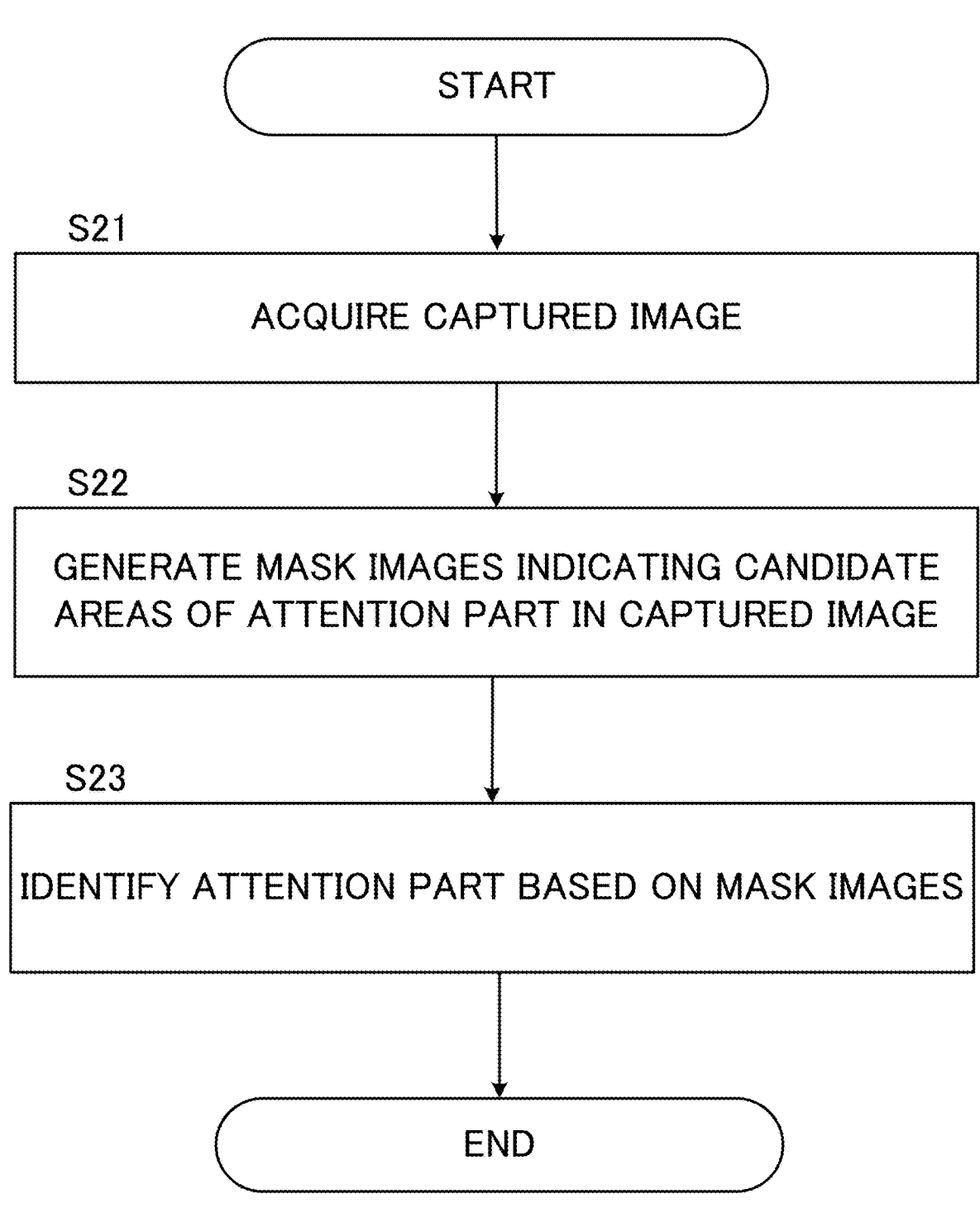
FIG. 10 is an example of a flowchart to be executed by the image processing device in the second example embodiment.

FIG. 10 is an example of a flowchart showing a processing procedure in the second example embodiment. First, the acquisition means 31X acquires a captured image acquired by photographing an inspection target by a photographing unit provided in an endoscope (step S21).

Next, the mask image generation means 32X generates a plurality of mask images which indicate candidate areas of an attention part in the captured image by different levels of granularity (step S22). Then, the identification means 33X identifies the attention part based on the plurality of the mask images (step S23).

According to the second example embodiment, the image processing device 1X can suitably identify the attention part in the captured image in which the inspection target is photographed based on a plurality of mask images which indicate candidate areas of the attention part by different levels of granularity.

The whole or a part of the example embodiments described above (including modifications, the same applies hereinafter) can be described as, but not limited to, the following Supplementary Notes.

Supplementary Note 1

An image processing device, comprising:

an acquisition means for acquiring a captured image acquired by photographing an inspection target by a photographing unit provided in an endoscope;

a mask image generation means for generating a plurality of mask images which indicate candidate areas of an attention part in the captured image by different levels of granularity; and an identification means for identifying the attention part based on the plurality of the mask images.

Supplementary Note 2

The image processing device according to Supplementary Note 1, wherein the plurality of mask images are images each indicating a reliability of being the attention part for each of grids corresponding to a plurality of pixels in the captured image, and wherein numbers of the grids determined according to the levels of granularity are different among the plurality of the mask images.

Supplementary Note 3

The image processing device according to Supplementary Note 1 or 2,

wherein the mask image generation means generates a plurality of feature maps having different scales based on the captured image and generates the plurality of the mask images from
the plurality of the feature maps, respectively.

Supplementary Note 4

The image processing device according to any one of Supplementary Notes 1 to 3,
wherein the identification means identifies the attention point based on a mask image selected from the plurality of the mask images.

Supplementary Note 5

The image processing device according to any one of Supplementary Notes 1 to 3,
wherein the identification means identifies the attention point based on a mask image into which the plurality of the mask images are integrated.

Supplementary Note 6

The image processing device according to Supplementary Note 4 or 5,
wherein the identification means calculates degrees of similarity between the plurality of the mask images and determines a mask image to be selected or integrated based on the degrees of similarity.

Supplementary Note 7

The image processing device according to any one of Supplementary Notes 1 to 6, further comprising
an output control means for outputting information relating to the attention part identified by the identification means.

Supplementary Note 8

The image processing device according to Supplementary Note 7,
wherein the output control means outputs, as the information relating to the attention part, at least one of information relating to presence or absence of the attention part or information relating to a position of the attention part in the captured image.

Supplementary Note 9

The image processing device according to Supplementary Note 7 or 8, further comprising
a granularity adjustment means for converting an image in which the attention part is identified into a granularity adjustment image that is an image indicating the attention part by a specified level of granularity,
wherein the output control means displays, on a display device, the granularity adjustment image or an image based on the granularity adjustment image.

Supplementary Note 10

The image processing device according to any one of Supplementary Notes 1 to 9, wherein the attention part is a part to be biopsied.

Supplementary Note 11

An image processing method executed by a computer, the image processing method comprising:
acquiring a captured image acquired by photographing an inspection target by a photographing unit provided in an endoscope;
generating a plurality of mask images which indicate candidate areas of an attention part in the captured image by different levels of granularity; and
identifying the attention part based on the plurality of the mask images.

Supplementary Note 12

A storage medium storing a program executed by a computer, the program causing the computer to:
acquire a captured image acquired by photographing an inspection target by a photographing unit provided in an endoscope;
generate a plurality of mask images which indicate candidate areas of an attention part in the captured image by different levels of granularity; and
identify the attention part based on the plurality of the mask images.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1X Image processing device
2 Display device
3 Endoscope
4 Server device
11 Processor
12 Memory
13 Interface
14 Input unit
15 Light source unit
16 Audio output unit
100 Endoscopic inspection system

What is claimed is:
1. An image processing device, comprising:
at least one memory configured to store instructions; and
at least one processor configured to execute the instructions to:
acquire a captured image acquired by photographing an inspection target by a photographing unit provided in an endoscope;
generate a plurality of mask images which indicate candidate areas of an attention part in the captured image by different levels of granularity; and
identify the attention part based on the plurality of the mask images, wherein the plurality of mask images are images each indicating a reliability of being the attention part for each of grids corresponding to a plurality of pixels in the captured image, and wherein numbers of the grids determined according to the levels of granularity are different among the plurality of the mask images.

2. The image processing device according to claim 1, wherein the at least one processor is configured to execute the instructions to generate a plurality of feature maps having different scales based on the captured image and generates the plurality of the mask images from the plurality of the feature maps, respectively.

3. The image processing device according to claim 1, wherein the at least one processor is configured to execute the instructions to identify the attention point based on a mask image selected from the plurality of the mask images.

4. The image processing device according to claim 3, wherein the at least one processor is configured to execute the instructions to calculate degrees of similarity between the plurality of the mask images and determines a mask image to be selected or integrated based on the degrees of similarity.

5. The image processing device according to claim 1, wherein the at least one processor is configured to execute the instructions to identify the attention point based on a mask image into which the plurality of the mask images are integrated.

6. The image processing device according to claim 1, wherein the at least one processor is configured to further execute the instructions to output information relating to the attention part.

7. The image processing device according to claim 6, wherein the at least one processor is configured to execute the instructions to output, as the information relating to the attention part, at least one of information relating to presence or absence of the attention part or information relating to a position of the attention part in the captured image.

8. The image processing device according to claim 6, wherein the at least one processor is configured to execute the instructions to convert an image in which the attention part is identified into a granularity adjustment image that is an image indicating the attention part by a specified level of granularity, wherein the at least one processor is configured to execute the instructions to display, on a display device, the granularity adjustment image or an image based on the granularity adjustment image.

9. The image processing device according to claim 1, wherein the attention part is a biopsy site.

10. The image processing device according to claim 1, wherein the at least one processor is configured to execute the instructions to generate the plurality of the mask images by using a mask image generation model trained through machine learning with training data including captured images and a plurality of mask images.

11. An image processing method executed by a computer, the image processing method comprising:

acquiring a captured image acquired by photographing an inspection target by a photographing unit provided in an endoscope;

generating a plurality of mask images which indicate candidate areas of an attention part in the captured image by different levels of granularity; and identifying the attention part based on the plurality of the mask images, wherein the plurality of mask images are images each indicating a reliability of being the attention part for each of grids corresponding to a plurality of pixels in the captured image, and wherein numbers of the grids determined according to the levels of granularity are different among the plurality of the mask images.

12. The image method device according to claim 11, further comprising generating a plurality of feature maps having different scales based on the captured image and generates the plurality of the mask images from the plurality of the feature maps, respectively.

13. The image processing method according to claim 11, further comprising identifying the attention point based on a mask image selected from the plurality of the mask images.

14. The image processing method according to claim 11, further comprising identifying the attention point based on a mask image into which the plurality of the mask images are integrated.

15. The image processing method according to claim 14, further comprising calculating degrees of similarity between the plurality of the mask images and determines a mask image to be selected or integrated based on the degrees of similarity.

16. The image processing method according to claim 11, further comprising outputting information relating to the attention part.

17. The image processing method according to claim 16, further comprising outputting, as the information relating to the attention part, at least one of information relating to presence or absence of the attention part or information relating to a position of the attention part in the captured image.

18. The image processing device according to claim 16, further comprising converting an image in which the attention part is identified into a granularity adjustment image that is an image indicating the attention part by a specified level of granularity, and displaying, on a display device, the granularity adjustment image or an image based on the granularity adjustment image.

19. The image processing method according to claim 11, wherein the attention part is a biopsy site.

20. A non-transitory computer readable storage medium storing a program executed by a computer, the program causing the computer to:

acquire a captured image acquired by photographing an inspection target by a photographing unit provided in an endoscope;

generate a plurality of mask images which indicate candidate areas of an attention part in the captured image by different levels of granularity; and identify the attention part based on the plurality of the mask images, wherein the plurality of mask images are images each indicating a reliability of being the attention part for each of grids corresponding to a plurality of pixels in the captured image, and wherein numbers of the grids determined according to the levels of granularity are different among the plurality of the mask images.

* * * * *